US012210589B2

United States Patent
Bandyopadhyay et al.

(10) Patent No.: US 12,210,589 B2
(45) Date of Patent: Jan. 28, 2025

(54) SYSTEM AND METHOD FOR LABEL GENERATION FOR TIMESERIES CLASSIFICATION

(71) Applicant: Tata Consultancy Services Limited, Mumbai (IN)

(72) Inventors: Soma Bandyopadhyay, Kolkata (IN); Anish Datta, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 804 days.

(21) Appl. No.: 17/477,771

(22) Filed: Sep. 17, 2021

(65) Prior Publication Data

US 2022/0138503 A1 May 5, 2022

(30) Foreign Application Priority Data

Nov. 5, 2020 (IN) .............................. 202021048367

(51) Int. Cl.
*G06F 18/21* (2023.01)
*G06F 18/214* (2023.01)
*G06F 18/231* (2023.01)
*G06N 20/20* (2019.01)

(52) U.S. Cl.
CPC ...... *G06F 18/2155* (2023.01); *G06F 18/2148* (2023.01); *G06F 18/231* (2023.01); *G06N 20/20* (2019.01)

(58) Field of Classification Search
CPC .................................................. G06F 18/2155
USPC ........................................................ 706/12
See application file for complete search history.

(56) References Cited

U.S. PATENT DOCUMENTS

| 11,314,563 | B1* | 4/2022 | Singh ....................... G06F 9/541 |
| 2015/0261863 | A1* | 9/2015 | Dey ..................... G06F 16/3332 |
| | | | 707/706 |
| 2019/0050673 | A1* | 2/2019 | Ukil ..................... G06F 18/2113 |
| 2019/0082988 | A1* | 3/2019 | Datta ....................... A61B 5/366 |
| 2019/0188319 | A1* | 6/2019 | Anerousis ............. G06F 16/367 |
| 2020/0167914 | A1* | 5/2020 | Stamatoyannopoulos .................. |
| | | | G16B 40/30 |

(Continued)

FOREIGN PATENT DOCUMENTS

CN   104657749 A   5/2015

OTHER PUBLICATIONS

Krist'of Marussy et al., "Success: A New Approach for Semi-Supervised Classification of Time-Series," Computer Science, 2013, pp. 437-447, Springer, http://www.cs.bme.hu/~buza/pdfs/marussy_success.pdf.

*Primary Examiner* — Reza Nabi
(74) *Attorney, Agent, or Firm* — Finnegan, Henderson, Farabow, Garrett & Dunner, LLP

(57) ABSTRACT

This disclosure relates generally to method and system for time series classification. Conventional methods for time-series classification requires substantial amount of annotated data for classification and label generation. The disclosed method and system are capable of generating accurate labels for time-series data by utilizing a small amount of representative data for each class. In an embodiment, the disclosed method generates a time-series data synthetically and associated labels by using a portion of the representative time-series data in each iteration, and self-correcting the generated labels based on a determination of quality of the generated labels using label quality checker models.

18 Claims, 6 Drawing Sheets

(56) References Cited

U.S. PATENT DOCUMENTS

| | | | | |
|---|---|---|---|---|
| 2021/0319046 | A1* | 10/2021 | Bandyopadhyay | G06N 3/044 |
| 2021/0326765 | A1* | 10/2021 | Ukil | G06N 5/01 |
| 2021/0405181 | A1* | 12/2021 | Junginger | G01S 17/89 |
| 2022/0092474 | A1* | 3/2022 | Chattopadhyay | G06N 20/00 |
| 2022/0138503 | A1* | 5/2022 | Bandyopadhyay | G06F 18/2148 |
| | | | | 706/12 |
| 2022/0161818 | A1* | 5/2022 | Solmaz | G08G 1/096725 |
| 2022/0180274 | A1* | 6/2022 | Makhija | G06N 3/045 |
| 2022/0189070 | A1* | 6/2022 | Rejeb Sfar | G06T 9/002 |
| 2022/0215378 | A1* | 7/2022 | Dhama | G06Q 20/3227 |
| 2022/0284316 | A1* | 9/2022 | Bucher | G06N 3/0464 |
| 2022/0293272 | A1* | 9/2022 | Pang | G16H 20/00 |
| 2022/0301689 | A1* | 9/2022 | Hu | G16H 50/20 |
| 2022/0318459 | A1* | 10/2022 | Narang | G06N 3/088 |
| 2023/0038256 | A1* | 2/2023 | Tal | G16B 40/00 |
| 2023/0078208 | A1* | 3/2023 | Egboga | G06N 5/04 |
| | | | | 706/12 |
| 2023/0180039 | A1* | 6/2023 | Zhohov | H03M 7/6041 |
| | | | | 370/328 |
| 2023/0325292 | A1* | 10/2023 | Ardel | G05B 23/0254 |
| | | | | 702/183 |
| 2023/0334300 | A1* | 10/2023 | Banerjee | G06N 3/049 |
| 2023/0378976 | A1* | 11/2023 | Mizutani | G08C 15/00 |
| 2024/0093605 | A1* | 3/2024 | Ramsay | G06N 3/088 |
| 2024/0143980 | A1* | 5/2024 | Bandyopadhyay | G06N 3/0455 |
| 2024/0271122 | A1* | 8/2024 | Bader | C12N 15/1058 |
| 2024/0320558 | A1* | 9/2024 | McCarthy | G06N 20/00 |
| 2024/0383133 | A1* | 11/2024 | Bydlon | G06N 3/0455 |
| 2024/0386015 | A1* | 11/2024 | Crabtree | G06F 16/9024 |

* cited by examiner

SYSTEM AND METHOD FOR LABEL GENERATION FOR TIMESERIES CLASSIFICATION

PRIORITY CLAIM

This U.S. patent application claims priority under 35 U.S.C. § 119 to: India Application No. 202021048367, filed on Nov. 5, 2020. The entire contents of the aforementioned application are incorporated herein by reference.

TECHNICAL FIELD

This disclosure relates generally to time-series signal analysis, and more particularly to method and system for label generation for time-series signal data.

BACKGROUND

With growing applications of internet and technology, large volumes of time-series data are being generated everyday. For example, huge amount of data is received from applications, users and end devices such as smart cities, continuous health care monitoring, machine health monitoring and so on. This huge volume of time-series data is analyzed by data miners to derive inferences and provide predictions of events.

Accurate analysis of the time-series data requires annotated/labelled data which can act as ground-truth. However, in various scenarios, the ground-truth data is unavailable or limited. For example, in some cases only weak supervision or knowledge is available. In such cases, annotating the data for training and/or validation purposes is time-consuming, as well as costly to get the labeling done by any domain expert. Moreover, due to dynamic learning environment of the applications relying on time-series data for prediction, a number of instances get accrued with respect to time, making it crucial to append the training data with the accrued instances.

SUMMARY

Embodiments of the present disclosure present technological improvements as solutions to one or more of the above-mentioned technical problems recognized by the inventors in conventional systems. For example, in one embodiment, a method for label generation for time-series classification is provided. The method includes receiving, via one or more hardware processors, a representative time-series data. Further, the method includes generating, via the one or more hardware processors, a time-series data synthetically and a plurality of labels associated with time-series data by using least a portion of the representative time-series data in each iteration of a plurality of iterations. Herein, the plurality of iterations includes iteratively generating at least a portion of the time-series data synthetically in each iteration of the plurality of iterations by applying a variational auto-encoder (VAE) to a predefined amount of representative time-series data. Further, the plurality of iterations includes appending one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels and determining, by a label quality checker model, a label quality measure indicative of quality of the updated set of labels, the label quality measure determined by computing a differences in a number of identical labels from amongst the set of labels generated in a current iteration and a previous iteration. On determination of the label quality measure below a predefined-threshold measure and satisfaction of a self-iteration count criteria associated with number of plurality of iterations within a predefined threshold value of iterations, self-correction of the updated set of labels to obtain a set of corrected labels is enabled. Also, appending one or more labels to the set of labels leads to reduction in percentage of the one or more noisy labels in the updated set of labels successively in each iteration.

In another aspect, a system for label generation for time-series classification is provided. The system includes a memory storing instructions, one or more communication interfaces; and one or more hardware processors coupled to the memory via the one or more communication interfaces. The one or more hardware processors are configured by the instructions to receive a representative time-series data; and generate a time-series data synthetically and a plurality of labels associated with time-series data by using least a portion of the representative time-series data in each iteration of a plurality of iterations. To perform the plurality of iterations, the one or more hardware processors are configured to iteratively generate at least a portion of the time-series data synthetically in each iteration of the plurality of iterations by applying a variational auto-encoder (VAE) to a predefined amount of representative time-series data; append one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels; determine, by a label quality checker model, a label quality measure indicative of quality of the updated set of labels, the label quality measure determined by computing a differences in a number of identical labels from amongst the set of labels generated in a current iteration and a previous iteration. On determination of the label quality measure below a predefined-threshold measure and satisfaction of a self-iteration count criteria associated with number of plurality of iterations within a predefined threshold value of iterations, self-correction of the updated set of labels to obtain a set of corrected labels is enabled. Herein, appending one or more labels to the set of labels leads to reduction in percentage of the one or more noisy labels in the updated set of labels successively in each iteration.

In yet another aspect, a non-transitory computer readable medium for a method for label generation for time-series classification is provided. The method includes receiving, via one or more hardware processors, a representative time-series data. Further, the method includes generating, via the one or more hardware processors, a time-series data synthetically and a plurality of labels associated with time-series data by using least a portion of the representative time-series data in each iteration of a plurality of iterations. Herein, the plurality of iterations includes iteratively generating at least a portion of the time-series data synthetically in each iteration of the plurality of iterations by applying a variational auto-encoder (VAE) to a predefined amount of representative time-series data. Further, the plurality of iterations includes appending one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels; and determining, by a label quality checker model, a label quality measure indicative of quality of the updated set of labels, the label quality measure determined by computing a differences in a number of identical labels from amongst the set of labels generated in a current iteration and a previous iteration. On determination of the label quality measure below a predefined-threshold measure and satisfaction of a self-iteration count criteria associated with number of plurality of iterations within a predefined threshold value of iterations, self-correction of the updated set of labels to obtain a set of corrected labels is enabled. Also, appending one or more labels to the set of labels leads to reduction in percentage of the one or more noisy labels in the updated set of labels successively in each iteration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
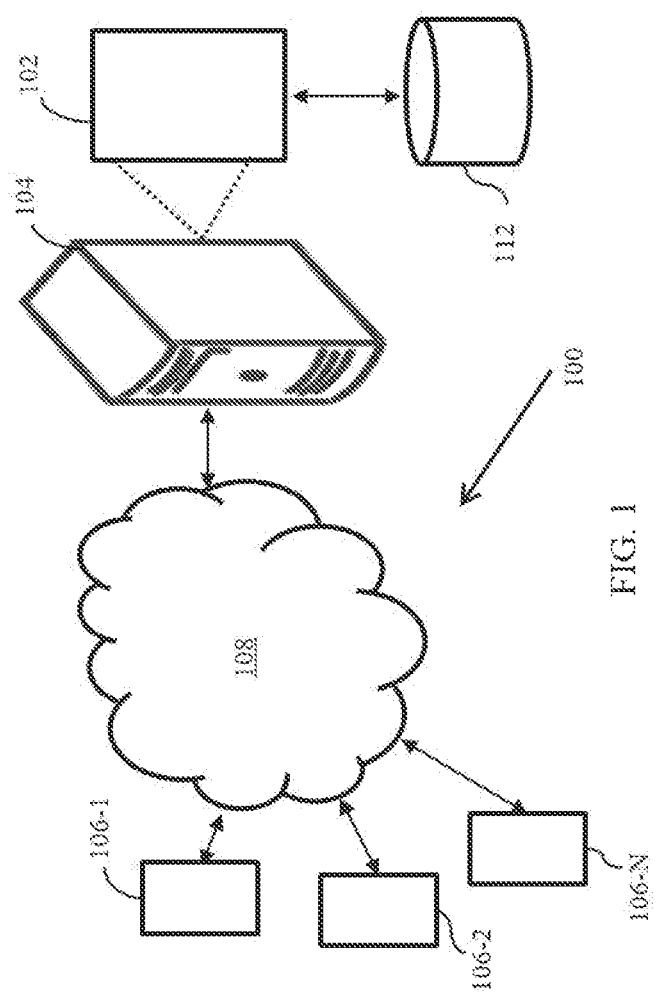
FIG. 1 illustrates a network implementation of a system for label generation for time-series classification according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Hierarchical time-series clustering with Auto Encoded Compact Sequence (HC-AECS): HC-AECS is a time-series clustering technique that convert both univariate and multivariate time-series into a fixed length compact latent representation of the time-series with the compact representation capturing all the significant features of the time-series data. Such compact representations considerably reduce time steps per time-series that need to be processed during hierarchical clustering of the time series data. The method disclosed provides a single computation efficient solution that can cluster the varying length univariate or multivariate time-series incoming sample data into hierarchical clusters along with recommending best distance measure and clustering, in a time efficient and computationally efficient manner.

The method for HC-AECS generating compact representation of the time-series to obtain a corresponding Auto Encoded Compact Sequences (AECS) of a constant length using a multilayered Seq2Seq Long Short-Term Memory (LSTM) auto encoder. Each of the AECS captures significant features of corresponding time-series. The plurality of AECS are clustered using an agglomerative hierarchical clustering to generate a Hierarchical Clusters, such that HCs includes a Chebyshev (CH) cluster (obtained using a CH distance as a similarity measure), a Mahalanobis (ML) cluster (obtained using a ML distance as the similarity measure) and a Manhattan (MA) cluster (obtained using a MA distance as the similarity measure). One HC is selected from among the Chebyshev, Mahalanobis and Manhattan HCs based on a modified Hubert statistics ($\tau$) used as an internal clustering measure. In particular, the selected HC has highest rank of modified Hubert statistics ($\tau$). The selected HC may be referred to as the most optimal or best HC, and the distance measure corresponding to the selected HC may be referred to as the optimal or best distance measure. The details of HC-AECS are covered in the Patent application No. 202021015292 titled "Method and system for hierarchical time-series clustering with auto encoded compact sequence (AECS))" filed at Indian Patent Office on Apr. 7, 2020, which is fully incorporated here by reference.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 illustrates an example network implementation 100 of a system 102 for label generation for time-series classification, in accordance with an example embodiment The input data includes a time-series data. Herein, the application may be an information technology (IT) application that may be implemented by means of corresponding software, hardware and firmware to execute instructions and perform certain functions. Examples of applications may include but are not limited to, an e-commerce shopping application, a social networking application, a payment application, a travel management application, and so on and so forth.

In an embodiment, the disclosed system 102 determines clusters and (noisy) labels for the time-series data by utilizing HC-AECS. The labels are generated in the first iteration using a small percentage of representative labelled data having a very few examples from the all the classes are utilized by a self-correction module to 'purify' the labels generated in different iterations by generating additional samples of the time-series data using a Variational Autoencoder (VAE). A VAE uses generative learning that follows a data distribution of the representative data or samples. Such additional samples of the time-series data may hereinafter be referred to as 'synthetic time-series data' or 'synthetic data' or 'time-series data generated synthetically' for the brevity of description. Herein, 'purifying' the labels refers to enhancing the quality of labels generated in every successive iteration. In other words, the labels generated in the first iteration may include one or more misclassified labels/impure labels, considering the fact that it has only the representative data to consider for label generation for first iteration, owing to relatively lesser accuracy of the labels generated as compared to the subsequent iterations. However, with every successive iteration more time-series data is generated synthetically followed by labeling of said data, in other words in successive iteration 'synthetic data' which is equal in amount of representative data is getting added with the representative data thereby doubling ((n=for example 5% of original data) representative data+(n) synthetic data) the amount of consideration of data with labels for $2^{nd}$ iteration, tripling in $3^{rd}$ iteration etc. hence improving the quality of labels generated in each iteration.

For generation of time-series data synthetically, the system 102 may receive at least a portion of the time-series data, hereinafter referred to as representative time-series data, pertaining to such applications and generate labels for performing classification tasks and consequently predictions pertaining to the application, accurately. Herein, the term 'representative time-series data' refers to a small percentage of the time-series data from each class that may be utilized for training a prediction model for the application. In an example embodiment, the small percentage of data may be around five percent of the time-series data received. The disclosed system 102 generates time-series data synthetically by using least a portion of the representative time-series data in each iteration of a plurality of iterations. In each iteration, the disclosed system 102 determines the labels for the time-series data by utilizing HC-AECS by forming groups/clusters and after that creates labels by exploiting the obtained best (or optimal) distance measure, and said labels are utilized for generating additional samples of data using a Variational Autoencoder (VAE) that follows the data distribution of the representative data or samples. Herein, in each iteration, the set of labels is updated, thereby reducing the percentage of impure labels in the set of noisy labels.

An important contribution of the disclosed embodiments is that the system 102 is capable of determining a label quality measure indicative of quality of the labels generated in an iteration (also referred to as a performance measure), and triggering self-correction of said labels on determination of the label quality measure below a predefined-threshold measure and satisfaction of a self-iteration count criteria associated with number of plurality of iterations within a predefined threshold value of iterations. Herein, self-correcting refers to assigning appropriate labels to the clusters for which the labels have been determined. The disclosed embodiments are particularly useful in scenarios where annotations and/or ground truth of the time-series data are not available, and only some weak supervision or knowledge is available.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2:
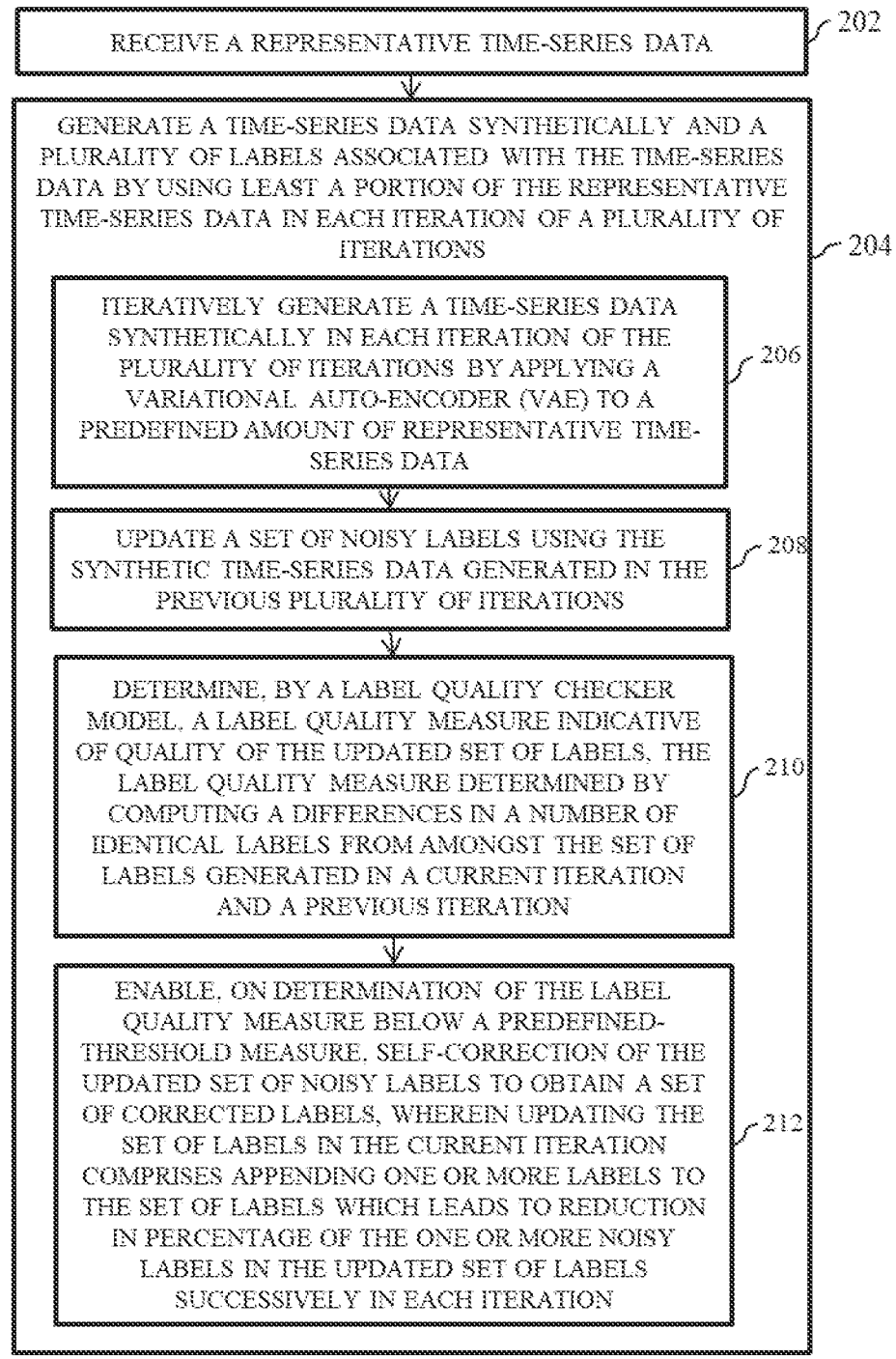
FIG. 2 is a flow diagram of a method for label generation for time-series classification according to an embodiment of the present disclosure.
Figure 3:
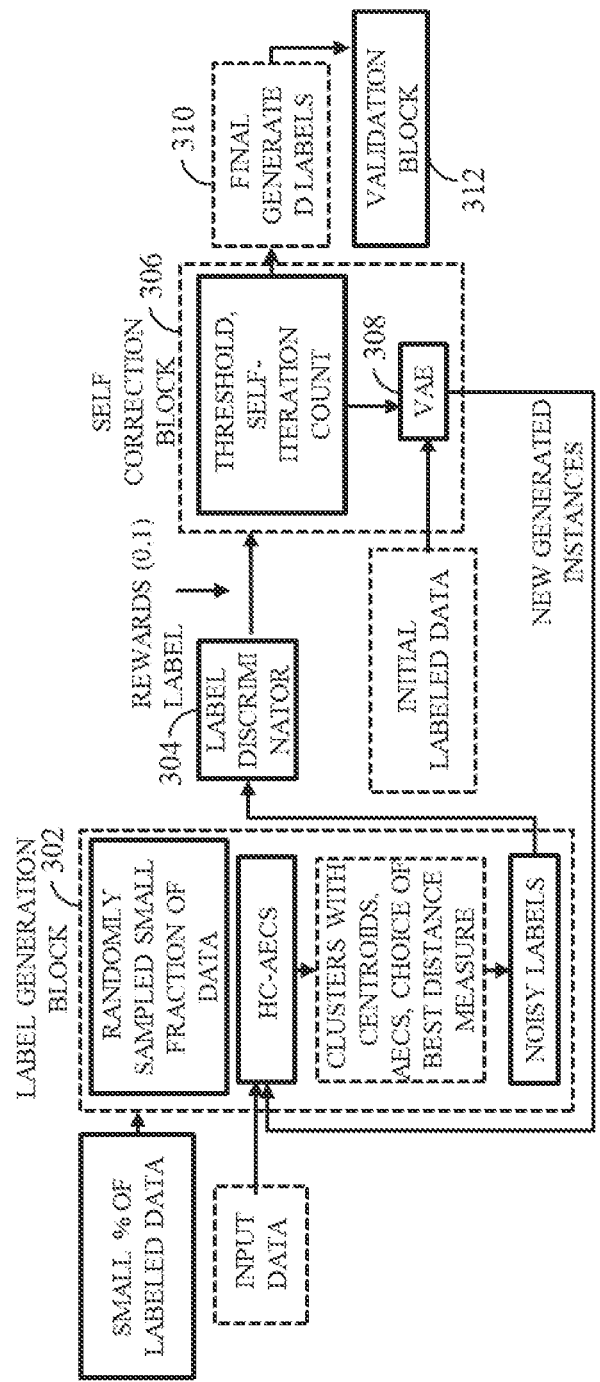
FIG. 3 is a functional block diagram of a system for label generation for time-series classification according to an embodiment of the present disclosure.
Figure 4:
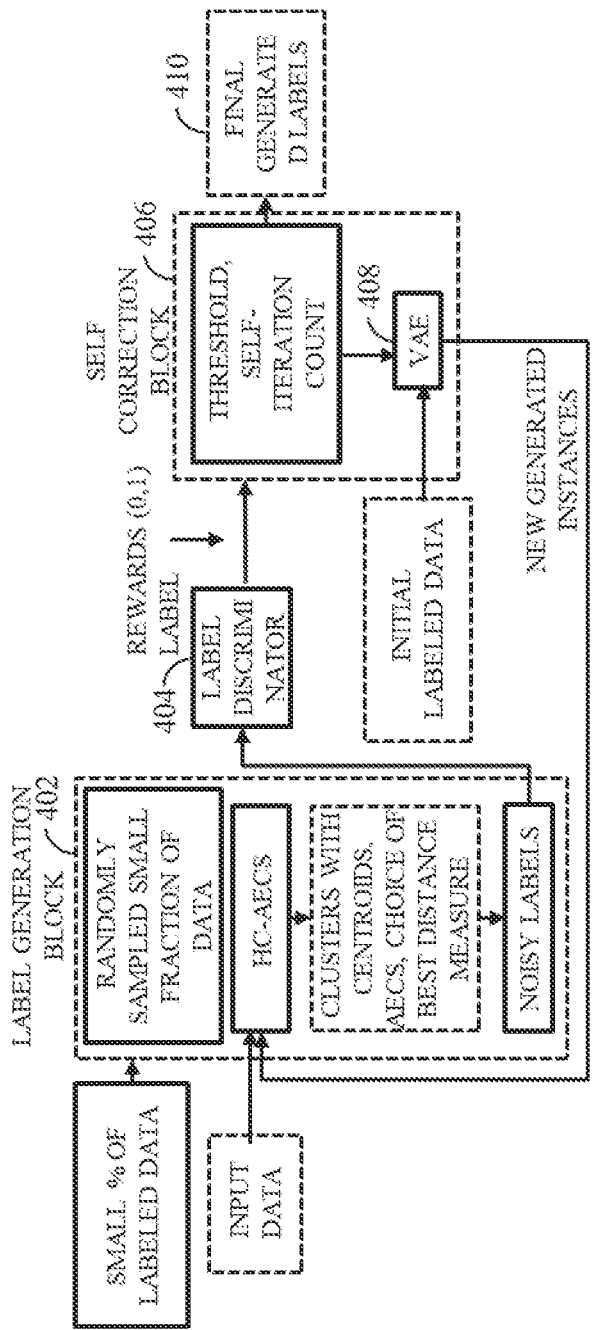
FIG. 4 is a functional block diagram of a system for label generation for time-series classification according to an embodiment of the present disclosure.
Figure 5:
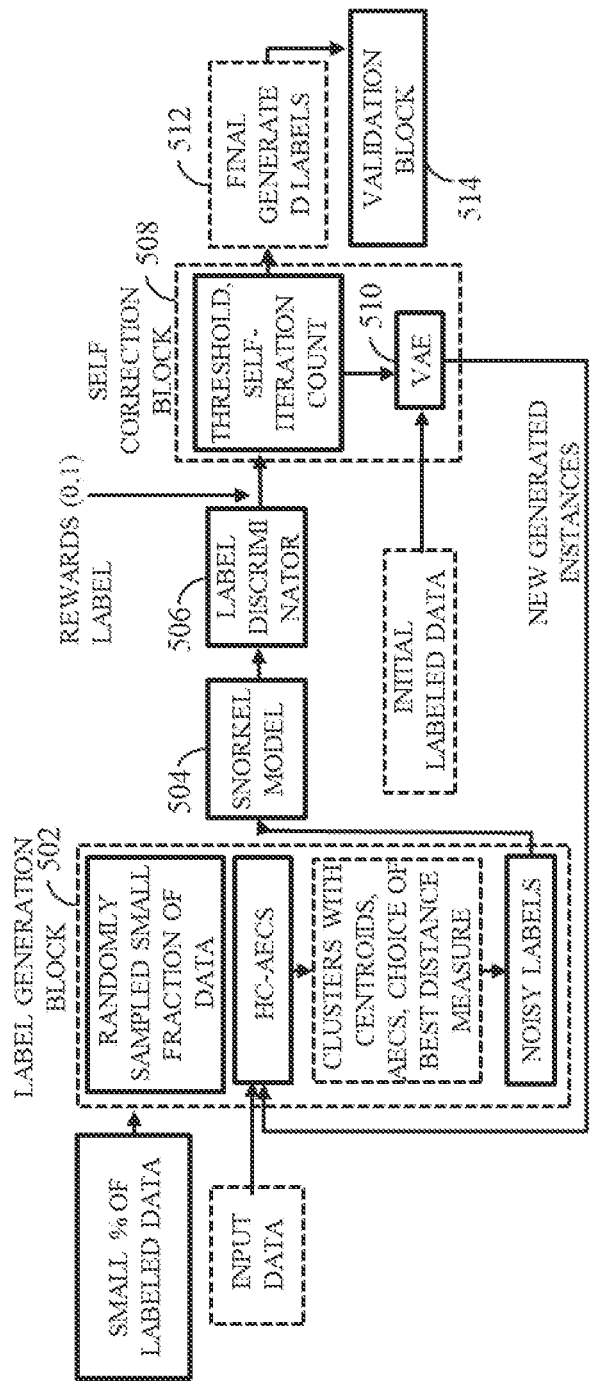
FIG. 5 is a functional block diagram of a system for label generation for time-series classification according to an embodiment of the present disclosure.

Referring collectively to FIGS. 2-5, components and functionalities of the system 102 for label generation for time-series classification is described in accordance with an example embodiment. For example, FIG. 2 illustrate a flow diagram for a method for label generation for time-series classification, in accordance with an example embodiment of the present disclosure. FIG. 3 illustrates an example block diagram of a system for label generation for time-series classification, in accordance with an example embodiment of the present disclosure. FIG. 4 illustrates an example flow diagram of a system for label generation for time-series classification, in accordance with another example embodiment of the present disclosure. FIG. 5 illustrates an example flow diagram of a system for label generation for time-series classification, in accordance with yet another example embodiment of the present disclosure.

In various embodiments described herein, clustering of time-series data is performed in a plurality of iterations with a very small initial dataset available for training. The method for label generation for time-series classification is described further in detail below with reference to 202-212.

The method is initiated by receiving an input data having multiple times-series. By utilizing HC-AECS, clusters and corresponding labels are generated for the time-series data.

In an embodiment, the clusters and the labels may be generated by a label generator block (e.g. label generator block 302 of FIG. 3 and a label generator block 402 of FIG. 4). The representative data taken initially is utilized for generating additional samples of the time-series data synthetically. The generation of time-series data synthetically and corresponding labels by utilizing the system 102 is described further with reference to the description below. The system 102 is represented with a block diagram architecture 300 (in FIG. 3), and a block diagram architecture 400 (in FIG. 4).

Referring collectively to FIGS. 2, 3 and 4, the method for label generation for time-series classification is described in accordance with an example embodiment. At 202, the method 200 includes receiving a representative time-series data. The representative time-series data may include a plurality of time-series which are learnt to generate auto encoded compact sequence (AECS) that is a latent representation of the time-series. In an example scenario, the time-series data may be obtained from an archive or a repository. Alternatively, the time-series data may be obtained in real-time from the application. In an example embodiment, the received multiple timeseries, to be clustered using the system 102, can be time-series data generated from any application such as machine health monitoring, smart cities and so on and so forth.

At 204, the method 200 includes generating a synthetic time-series data and a plurality of labels associated with the synthetic time-series data by using least a portion of the representative time-series data in each iteration of a plurality of iterations. The method for generation of the synthetic time-series data and the plurality of labels in the plurality of iterations is described further with reference to FIGS. 3 and 4 in conjunction with steps 206-212.

At step 206, the method 200 includes iteratively generating a time-series data synthetically in each iteration of the plurality of iterations by applying a VAE to a predefined amount of representative time-series data. In an example embodiment, the VAE is $P(X_j\ z;\ \Omega)=N(X_j\ f\ (z;\ \Omega),\ s2\ I)$, where X is a time-series data associated with an iteration from amongst the plurality of iterations, $\Omega$ is a parameter, and $f\ (z;\ \Omega)$ is a multi-layer neural network comprising an long short term memory (LSTM) followed by a dense layer.

The synthetic time-series data is iteratively generated in each iteration of the plurality of iterations. In a first iteration, for example, a set of labels (including one or more noisy labels) are generated by the label generator block (block 302, 402, 502 of FIGS. 3, 4, 5 respectively), as explained further. In the first iteration, the label generator block utilizes a small portion/fraction (e.g. about five percent) of the representative time-series data randomly sampled from each class from the given data with class labels. Herein, it will be noted that small portion of fraction of the representative data taken in the first iteration may be in the range of 2% to 15%. As will be described further in the description below with the help of experimental results, the exemplary best bound of the portion of the representative data for this iteration is in the range of 2% to 15%, though based on user requirements the best bound may go up to 35% in certain scenarios. It will however be understood that the aforementioned ranges of the portion of representative data are provided herein for exemplary purposes, and same shall be varied in different scenarios, for example depending upon size of the representative time series data and/or application requirements.

The sample data along with the class labels associated therewith are utilized for clustering the data in the first iteration using the hierarchical clustering technique known as HC-AECS. Said hierarchical clustering technique measure similarities among the pair of time-series to put them into same cluster and measures linkage, i.e., the dissimilarities between the pair of groups of time-series to take the decision of further fusing the clusters. Once multiple HCs are generated, each based on one type of similarity measure (e.g. Mahalanobis (ML) distance measure, Chebyshev (CH) distance measure and Manhattan (MA) distance measure), a best HC is selected from among the HCs by applying modified Hubert Statistic ($\tau$) as internal clustering measure. Mathematical notations for different types of similarity measures are given below:

Chebyshev distance $(CH)=\max_i (|x_i-y_i|)$

Mahalanobis distance$(ML)=\sqrt{(X-Y)^T \cdot C^{-1} \cdot (X-Y)}$ where X,Y are taken as vectors and C is a covariance matrix between X and Y.

$$\text{Canberra distance}\ (CA) = \sum_{i=1}^{n} \frac{|x_i - y_i|}{x_i + y_i}$$

Manhattan distance $(MN)=\Sigma_{i=1}^{n}|x_i-y_i|$

Performance metric: Rand index as external measure and Modified Hubert Statistic as internal measure $$\text{Rand Index} = \frac{TP+FP}{TP+TP+TN+FN};$$

where the symbols denote the cardinalities of sets of pairs:
TP (true positive)—elements assigned to the same cluster that are in the same class; TN (true negative)—elements assigned to different clusters that are in different classes;
FP (false positive)—elements assigned to different clusters that are in the same class; FN (false negative)—elements assigned to the same cluster that are in different classes.

Modified Hubert Statistic =

$$\frac{2}{n(n-1)} \sum_{x \in D} \sum_{y \in D} dist(x,\ y) dis(c_i,\ c_j)_{x \in C_i, y \in C_j}$$

where D is the dataset, n is the number of elements in the dataset, k is the number of clusters, $C_i$ is the $i^{th}$ cluster, $n_i$ is the number of elements in the cluster $C_i$, $c_i$ is the center of the cluster $C_i$.

In an embodiment, there may be a possibility of overlap in some cases, such that the representative data are equidistant or difficult to decide the nearest distance measure from the centroids. In such cases, for a cluster, the number of representative samples for two or more classes may be assumed to be the same. Here for the representative samples of each class, its median/mean are calculated and a Hubert statistic is determined for the representative samples of each class with the cluster it is nearest to considering corresponding centroid of that cluster. The cluster is labeled as the class whose representative samples have the lowest Hubert statistic score as it suggest the representative samples of the class and the cluster are more close to each other.

The set of labels (including the one or more noisy labels) are generated based on the selection of best hierarchical cluster with centroids, and best distance measure. In an embodiment, the representative time-series data is taken from each class (e.g. about 2% to 15%), and a distance from the centroid of each cluster formed by HC-AECS to the representative data is measured using the best distance measure obtained by HC-AECS. The method further includes identifying a nearest centroid of the HC-AECS clustering is from the representative data. Class association of a cluster (also referred to as cluster-class association) is obtained by the majority of nearest representative samples belonging to a class. Said cluster-class association provides a class label for that cluster centroid as well as the cluster. The class labels so generated may be referred to as 'noisy labels' since the labels are generated by using only a small percentage of the time-series data.

Let, Number of instances=m,
Number of timesteps=t,
Number of dimensions=d,
Latent representation length=n
The dataset $D \in R^{m \times t \times d}$ along with the types of similarity measures is input to HC-AECS block. The output of the HC-AECS block is a best distance measure ($d_{best}$), cluster labels (C) and number of clusters (k).

The Cluster labels (C), AECS→ Centroids of the clusters (Cen)

$$Cen_i = \frac{1}{|C_i|} \sum_{j \in i} AECS_j,$$

where $|C_i|$ is the cardinality of cluster i.

Let RS be the representative labeled samples taken randomly from each class (say p % from each class). Now the class label for the cluster are represented as $Class_i = Max\_Count_{j \in RS(i)} Class(j),$ where j is an element of set RS(i) and Class(j) is the class of sample j. Max_count gives the class with maximum frequency.

Let num be total number of representative samples.

Declare 2D array $dist_{ij} = d_{best}(cen_i, AECS_j)$ where $cen_i$ is centroid of $i^{th}$ cluster and $AECS_j$ is latent representation of $j^{th}$ representative sample.

$C\_best = Argmin(dist)$

To find the cluster from whose centroid the representative sample is at lowest distance:

$Clus\_to\_class_i = $Class having maximum representative samples nearest to cluster i.

All the instances in a cluster i are mapped to class $Clus\_to\_class_i$. These labels are used as noisy labels.

In one embodiment, (as depicted in FIG. 3) once noisy labels are obtained, an accuracy threshold is utilized to determine a tolerance for the difference between the accuracy of a benchmark classifier on the generated labels and the actual labels. If said difference is higher than the accuracy threshold, new representative samples are taken. In an embodiment, if new representative samples are not available, labeled instanced can be generated using a Variational Autoencoder (VAE) by using a set of representative samples already available. For each class, new representative samples are generated using the VAE. The representative samples created using the VAE (for example, block 308, 408, 510 of FIGS. 3, 4, 5 respectively) are then passed to the noisy label generation block to create a new set of noisy labels, as will be explained further in the description below.

In an embodiment, the noisy labels generated in a current iteration are appended to the noisy labels generated in previous iterations to obtain an updated set of (noisy) labels at 208. The quality of the updated set of labels (including the noisy labels) is checked at 210, by using a label quality checker model (shown as block 304, 404, 506 of FIGS. 3, 4, 5 respectively). The label quality checker model determines a label quality measure indicative of quality of the updated set of labels. For any given iteration (or current iteration), the label quality measure is determined by computing a difference in number of the set of noisy labels generated in a current iteration and a previous iteration. In an embodiment, the label quality checker model measures the quality, and if there is a perceptible variation of labels generated in an iteration (for example between 0% to 1%) with respect to the previous iteration, it indicates that the data generated in previous iteration brings improvement in label quality. In such a scenario, an output or a reward of the label quality checker model is 1 and the value of self-iteration count is set to zero. If however (for example, in an ideal case for saturation), the variation of labels generated in the current and previous iteration is zero percent or if the performance remains same as compared to the previous iteration, then the reward goes as feedback zero towards the self-correction block and the value of self-iteration count is incremented by 1. The value of reward may determine whether or not to trigger the self-correction block to generate the data synthetically or not along with self-iteration count.

At 212, the method 200 includes triggering self-correction (by a self-correction block, for example block 306, 406, 508 of FIGS. 3, 4, 5 respectively) of the updated set of labels to obtain a set of corrected labels on determination of the label quality measure below a predefined-threshold measure and satisfaction of a self-iteration count criteria associated with number of plurality of iterations within a predefined threshold value of iterations. For example, in an embediment, a threshold self-iteration count is initialized (for example, to a value 3) which controls how many iterations to allow when the performance remains same and the threshold to benchmark accuracy is not reached. If self-iteration count exceeds the threshold self-iteration count, the occurrence of iterations is stopped. In an experimental scenario, for a dataset MoteStrain, accuracy using 5% labeled data (Iteration 0) was 0.461, using 5% labeled data +5% generated data (Iteration 1) was 0.461 and using 5% labeled data +10% generated data (Iteration 2) was 0.602. So, here in Iteration 0 self-iteration count is 0 and in iteration 1 it becomes 1 as the accuracy is equal to previous iteration (0.461). Now as self-iteration count (1) is less than 3, which is maximum self-iteration count, the method may proceed to the next iteration. In iteration 2, the self-iteration count becomes 0 as the accuracy (0.602) increases as compared to the previous iteration (0.461).

At the end of each iteration, an n % of synthetic labelled time series data (i.e. synthetic data with associated labels) is getting generated from the VAE. For a subsequent iteration, the synthetic data generated in the previous iterations is utilized to further generate n % of synthetic labelled data. In an example scenario, new instances are provided which are not part of original set. In the present scenario, new representative samples (or representative time-series data) may be provided to annotate which may have variable time-series length. In this case, AECS of the new representative samples may be computed. Now that the lengths of the latent representation of the new representative samples are same as the existing representative samples (n), the new representative samples may be clustered with the existing representative samples using Hierarchical clustering and find the new centroids. In the present scenario, the representative labeled samples are taken from the original set of labeled samples (representative data). Now the aforementioned method is performed to map the different clusters to the classes and hence the new instances are assigned to respective classes.

In another scenario, it may not be feasible to provide representative labeled samples more than once. In such a scenario, the Variational Autoencoder (VAE) may be used to generate new representative samples from the ones that are provided equal in no provided against each class, thereby overcoming the challenge of obtaining random labeled samples in different batches.

In yet another scenario, the benchmark results may not be available. In the present embodiment, the threshold for the activation of the self-correction block cannot be defined. In this scenario, other knowledge like class distribution, feature distribution across classes can be useful for checking if self-activation block is required.

As is explained previously, the process of generation of synthetic data and associated labels, checking the accuracy of created noisy labels and creating more synthetic data from the representative samples (by the VAE) is performed till the self-iteration count criteria (i.e. self-iteration count equal to the maximum or threshold number of self-iteration count) is satisfied. Once the self-iteration count criteria is satisfied, the labels generated in the plurality of iterations may be validated using a discriminative/benchmark model. Herein, self-iteration count criteria refers to a variable that facilitates in determining, if and when, the performance of the system 102 saturates i.e. gives same level of accuracy over a number of consecutive iterations. Herein, the performance is defined in terms of computing the differences in a number of identical labels from amongst set of labels generated in the current and previous iterations.

In an embodiment, if the performance of the system 102 remains same as the previous (or immediately preceding) iteration, then the value of self-iteration count may be incremented by 1. If, however, the performance of the system 102 increases in the current iteration as compared to previous then the value of self-iteration count may be assigned to 0. In an embodiment, the self-iteration count may be set to a Max self-iteration count to control the limit on the number of iterations to allow when the performance remains same and the threshold to reach benchmark accuracy is not obtained. The Max self-iteration count may be initialized (e.g. to a value three) which controls how many. If for a current iteration, the self-iteration count exceeds the Max self-iteration count, the iteration to generate more data may be stopped, and labels generated in the previous iterations may be reported as final labels 310. In an embodiment, the disclosed system may include a validation block 312 for validating the generated labels 310 with a discriminative model that may provide benchmark for validating the results.

In another embodiment (as illustrated in FIG. 4), the label quality checker model may include a benchmark discriminator model that is capable of validating the correctness of the labels generated, for example the final generated labels 410. In such an architecture, the validation module may be precluded, as shown in FIG. 4.

In yet another embodiment (illustrated in FIG. 5), instead of directly providing the updated set of noisy labels to the label quality checker model, the set of noisy labels are passed to a Snorkels Generative model 504 as distinct labeling functions. For example, in the present embodiment, three or more sets of noisy labels may be generated from each of the label generation block (using HC-AECS). The Snorkel's Generative model provides a label using three or more sets of noisy labels as a weak supervision source. Said three or more sets of noisy labels, also referred to as probabilistic labels are passed through the label quality checker model to obtain the trained classifier. In the present embodiment, the disclosed system may include a validation block 514 for validating the generated labels 512 with a discriminative model that may provide benchmark for validating the results. An example computer system implementing disclosed embodiments is described further with reference to FIG. 6.

Figure 6:
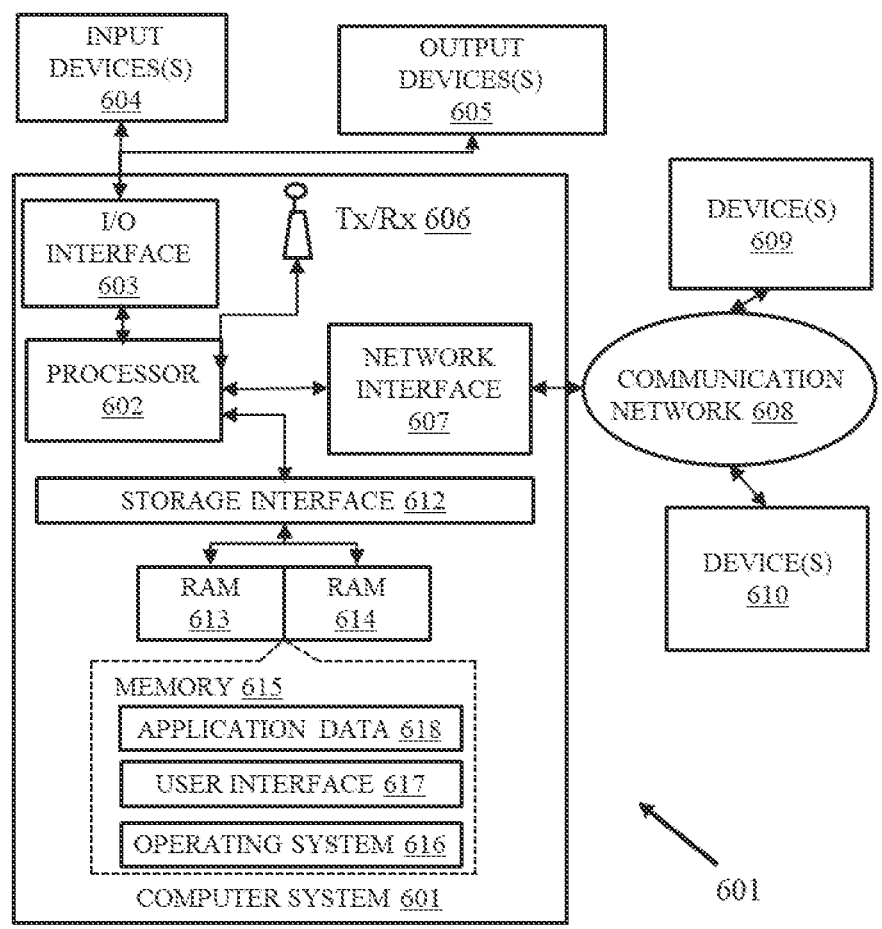
FIG. 6 is a block diagram of an exemplary computer system for implementing embodiments consistent with the present disclosure.

FIG. 6 is a block diagram of an exemplary computer system 601 for implementing embodiments consistent with the present disclosure. The computer system 601 may be implemented in alone or in combination of components of the system 102 (FIG. 1). Variations of computer system 601 may be used for implementing the devices included in this disclosure. Computer system 601 may comprise a central processing unit ("CPU" or "hardware processor") 602. The hardware processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 616, user interface application 617, user/application data 618 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

An example scenario depicting the results of label generation performed by the disclosed system 102 is described below.

Example Scenario

For the purpose of experimentation, dataset UCR/UCI is taken from freely available resources. The data is associated with diverse domains. Particularly, the experiments have been conducted on eight univariate datasets from UCR time series classification archive ('timesclassification.com') and 1 multivariate dataset from UCI archive (Wafer dataset). The dataset and results of the experimentation for the proposed method and system for automated label generation with weak supervision using various small percentage of labelled data (exemplary 5%, 10% and 15%) are as follows:

TABLE 1

Dataset description.

| Sensor | Dataset | Train size | Test size | Classes | Timesteps | Dimensions |
|---|---|---|---|---|---|---|
| Accelerometer | SonyAIBORobotSurface2 | 27 | 953 | 2 | 65 | 1 |
| | Earthquakes | 322 | 139 | 2 | 612 | 1 |
| Motion | ToeSegmentation2 | 36 | 130 | 2 | 343 | 1 |
| Capture | ToeSegmentation1 | 40 | 228 | 2 | 277 | 1 |
| Camera | GunPoint | 50 | 150 | 2 | 150 | 1 |
| Process | Wafer UCI | 298 | 896 | 2 | 104-198 | 6 |
| Control | MoteStrain | 20 | 1252 | 2 | 84 | 1 |

TABLE 1-continued

Dataset description.

| Sensor | Dataset | Train size | Test size | Classes | Timesteps | Dimensions |
|---|---|---|---|---|---|---|
| sensors | | | | | | |
| ECG | TwoLeadECG | 23 | 1139 | 2 | 82 | 1 |
| Camera (ImageOutline as timeseries) | DistalPhalanxOAG | 400 | 139 | 3 | 80 | 1 |

TABLE 2

Results for architecture (of FIGS. 3 and 4)

| Sensor | Dataset | Bench mark Classifier | Bench mark Accuracy | Proposed method with self-correction ( % of labeled data) | | | Diff with Benchmark Accuracy |
|---|---|---|---|---|---|---|---|
| | | | | 5% | 10% | 15% | |
| Accelerometer | SonyAIBORobotSurface2 | BOSS | 0.831 | 0.738 | 0.744 | 0.786 | Lower(4.5%) |
| | Earthquakes | RandF | 0.748 | 0.748 | 0.755 | 0.755 | Higher(0.7%) |
| Motion Capture | ToeSegmentation2 | BOSS | 0.923 | 0.762 | 0.885 | 0.923 | Equal |
| | ToeSegmentation1 | BOSS | 0.851 | 0.728 | 0.868 | 0.868 | Higher(1.5%) |
| Camera | GunPoint | BOSS | 0.98 | 0.700 | 0.786 | 0.913 | Lower(6.87%) |
| Process Control | Wafer UCI | MLSTM-FCN | 0.909 | 0.965 | 0.965 | 0.965 | Higher(5.56%) |
| sensors | MoteStrain | BOSS | 0.895 | 0.602 | 0.809 | 0.841 | Lower(5.4%) |
| ECG | TwoLeadECG | BOSS | 0.895 | 0.500 | 0.672 | 0.870 | Lower(2.95%) |
| Camera (ImageOutline as timeseries) | DistalPhalanxOAG | MLP | 0.727 | 0.612 | 0.712 | 0.719 | Lower(0.8%) |

TABLE 3

Results for architecture (of FIG. 5)

| Sensor | Dataset | Bench mark Classifier | Bench mark Accuracy | Proposed method with self-correction ( % of labeled data) | | | Difference with Benchmark Accuracy |
|---|---|---|---|---|---|---|---|
| | | | | 5% | 10% | 15% | |
| Accelerometer | SonyAIBORobotSurface2 | BOSS | 0.831 | 0.738 | 0.760 | 0.805 | Lower(2.6%) |
| | Earthquakes | RandF | 0.748 | 0.748 | 0.755 | 0.755 | Higher(0.7%) |
| Motion Capture | ToeSegmentation2 | BOSS | 0.923 | 0.762 | 0.885 | 0.923 | Equal |
| | ToeSegmentation1 | BOSS | 0.851 | 0.728 | 0.859 | 0.859 | Higher(0.8%) |
| Camera | GunPoint | BOSS | 0.98 | 0.700 | 0.786 | 0.913 | Lower(6.87%) |
| Process Control | Wafer UCI | MLSTM-FCN | 0.909 | 0.965 | 0.965 | 0.965 | Higher(5.56%) |
| sensors | MoteStrain | BOSS | 0.895 | 0.461 | 0.809 | 0.841 | Lower(5.4%) |
| ECG | TwoLeadECG | BOSS | 0.895 | 0.468 | 0.672 | 0.870 | Lower(2.95%) |
| Camera (ImageOutline as timeseries) | DistalPhalanxOAG | MLP | 0.727 | 0.655 | 0.683 | 0.719 | Lower(0.8%) |

From the experiments, it has been observed that the number of datasets in which architecture of FIG. 3 gives better/equal results than architecture of FIG. 5 (for 5% labelled data) is eight (out of nine), and out performs in one case MoteStrain.

Number of datasets in which Architecture of FIG. 3 gives better/equal results than Architecture of FIG. 5 (for 10% labelled data) is eight (out of nine); and Out performs in one case ToeSegmentation1, DistalPhalanxOAG Number of datasets in which Architecture of FIG. 3 gives better/equal results than Architecture of FIG. 5 (For 15% labelled data) is eight (out of nine); and Out performs in one case ToeSegmentation1, DistalPhalanxOAG The discriminative model used in each case is the Benchmark classifier. The benchmark accuracy reported here is calculated using the benchmark classifier implemented through packages sktime/pyts with true labels. The accuracy is computed on the test set for both benchmark classifier and proposed model.

In another example embodiment, the data sets considered were GunPoint, SonyAIBORobotSurface2, MoteStrain. The results of the experiments are shown in table 4 below:

TABLE 4

Results

| Benchmark | Gun-Point 0.98 (BOSS) | SonyAIBO-RobotSurface2 0.831 (BOSS) | Mote-Strain 0.895 (BOSS) |
|---|---|---|---|
| 5%  | 0.7    | 0.738  | 0.461  |
| 10% | 0.787  | 0.76   | 0.809  |
| 15% | 0.913  | 0.805  | 0.841  |
| 20% | 0.913  | 0.807  | 0.879* |
| 25% | 0.9    | 0.807  | —      |
| 30% | 0.88   | 0.83*  | —      |
| 35% | 0.9    | 0.83   | —      |
| 40% | 0.947* | —      | —      |
| 41% | 0.947* | —      | —      |
| 42% | 0.9    | —      | —      |
| 43% | 0.9    | —      | —      |
| 44% | 0.947  | —      | —      |
| 45% | 0.92   | —      | —      |

Herein, (*) indicates that the system reached within the acceptable tolerance limit from the benchmark accuracy (i.e. within 3%)

From the above table (table 4), it was observed that for GunPoint, the accuracy obtained up to 35% labelled data is not significant compared to the benchmark accuracy. At 40% labelled data, an accuracy of 0.947 is obtained which comes within 3% (approx.) of benchmark accuracy. Further, increasing labelled data beyond 40% does not increase the accuracy beyond 0.947 (as shown in range 41% to 45%). Further, it can be seen for SonyAIBORobotSurface2 that the accuracy reaches 0.830 at 30% labelled data which is very close to the benchmark accuracy (0.831). It remains saturated when we increase to 35% labelled data. At 20% labelled data, MoteStrain reaches accuracy 0.879 which is within the threshold (3%) of benchmark accuracy.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literale language of the claims or if they include equivalent elements with insubstantial differences from the literal language of the claims.

Various embodiments disclosed herein provides method and system for label generation for time-series classification. In particular, the disclosed method and system enables generation of synthetic labels in a manner that results in set reduction of label cost with label/annotation generation function. The embodiments of present disclosure herein addresses unresolved problem of generating labels with very small amount of/insufficient amount of training (or annotated data). The embodiment thus provides method and system for iteratively generating noisy labels improving in each iteration and further generating synthetic data using representative sample time-series data-. The noisy labels are generated using a best distance measure thereby generation of labels using most optimum distance measure.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
receiving, via one or more hardware processors, a representative time-series data; and
generating, via the one or more hardware processors, a time-series data synthetically and a plurality of labels associated with time-series data by using least a portion of the representative time-series data in each iteration of a plurality of iterations, wherein the plurality of iterations comprises:
iteratively generating at least a portion of the time-series data synthetically in each iteration of the plurality of iterations by applying a variational auto-encoder (VAE) to a predefined amount of representative time-series data;
appending one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels;
determining, by a label quality checker model, a label quality measure indicative of quality of the updated set of labels, the label quality measure determined by computing a differences in a number of identical labels from amongst the set of labels generated in a current iteration and a previous iteration; and
triggering self-correction of the updated set of labels to obtain a set of corrected labels on determination of the label quality measure below a predefined-threshold measure and satisfaction of a self-iteration count criteria associated with number of plurality of iterations within a predefined threshold value of iterations,
wherein appending the one or more labels to the set of labels which leads to reduction in percentage of the one or more noisy labels in the updated set of labels successively in each iteration,
wherein the plurality of labels are generated by applying Hierarchical clustering on learned Auto-encoded compact sequence (HC-AECS) on the representative time-series data, wherein applying the HC-AECS comprises determining an optimal distance measure indicative of class-cluster association in the time-series data by using at least a set of labelled samples representative time-series data.

2. The method of claim 1, wherein at least the portion of the representative time-series data comprises around five percent of the portion of the representative time-series data.

3. The method of claim 1, wherein the VAE is capable of learning a latent representation for a current iteration from the representative time-series data and the time-series data synthetically generated in a set of previous iterations from amongst the plurality of iterations.

4. The method of claim 1, wherein iteratively generating the time-series data synthetically comprises generating a new set of labels in each iteration, and combining the new set of labels, by using a Snorkel's model, one or more labels obtained using the predefined amount of representative time-series data and the synthetic time-series data generated in the set of previous iterations.

5. The method of claim 1, wherein iteratively generating the time-series data synthetically comprises generating a new set of labels in each iteration, and comparing the new set of labels, by using the label quality checker model, one or more labels obtained from the predefined amount of representative time-series data and an equal amount of synthetic time-series data generated in the set of previous iterations.

6. The method of claim 1, wherein iteratively generating the time-series data synthetically comprises generating identical amount of data using the VAE, the amount being same with an initial amount of representative data.

7. A system for label generation for time-series classification, comprising:
a memory storing instructions:
one or more communication interfaces; and
one or more hardware processors coupled to the memory via the one or more communication interfaces, wherein the one or more hardware processors are configured by the instructions to:
receive a representative time-series data; and
generate a time-series data synthetically and a plurality of labels associated with time-series data by using least a portion of the representative time-series data in each iteration of a plurality of iterations, wherein to perform the plurality of iterations, the one or more hardware processors are configured to:
iteratively generate at least a portion of the time-series data synthetically in each iteration of the plurality of iterations by applying a variational auto-encoder (VAE) to a predefined amount of representative time-series data;
append one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels;
determine, by a label quality checker model, a label quality measure indicative of quality of the updated set of labels, the label quality measure determined by computing a differences in a number of identical labels from amongst the set of labels generated in a current iteration and a previous iteration; and
trigger self-correction of the updated set of labels to obtain a set of corrected labels on determination of the label quality measure below a predefined-threshold measure and satisfaction of a self-iteration count criteria associated with number of plurality of iterations within a predefined threshold value of iterations,
wherein appending the one or more labels to the set of labels which leads to reduction in percentage of the one or more noisy labels in the updated set of labels successively in each iteration,
wherein the plurality of labels are generated by applying Hierarchical clustering on learned Auto-encoded compact sequence (HC-AECS) on the representative time-series data, wherein to apply the HC-AECS, the one or more hardware processors are configured by the instructions to determine an optimal distance measure indicative of class-cluster association in the time-series data by using at least a set of labelled samples representative time-series data.

8. The system of claim 7, wherein at least the portion of the representative time-series data comprises around five percent of the portion of the representative time-series data.

9. The system of claim 7, wherein the VAE is capable of learning a latent representation for a current iteration from the representative time-series data and the time-series data synthetically generated in a set of previous iterations from amongst the plurality of iterations.

10. The system of claim 7, wherein to iteratively generate the time-series data synthetically, the one or more hardware processors are configured by the instructions to generate a new set of labels in each iteration, and combine the new set of labels, by using a Snorkel's model, one or more labels obtained using the predefined amount of representative time-series data and the synthetic time-series data generated in the set of previous iterations.

11. The system of claim 7, wherein to iteratively generate the time-series data synthetically, the one or more hardware processors are configured by the instructions to generate a new set of labels in each iteration, and compare the new set of labels, by using the label quality checker model, one or more labels obtained from the predefined amount of representative time-series data and an equal amount of synthetic time-series data generated in the set of previous iterations.

12. The system of claim 7, wherein to iteratively generate the time-series data synthetically, the one or more hardware processors are configured by the instructions to generate identical amount of data using the VAE, the amount being same with an initial amount of representative data.

13. One or more non-transitory machine-readable information storage mediums comprising one or more instructions which when executed by one or more hardware processors cause:
receiving, via one or more hardware processors, a representative time-series data; and
generating, via the one or more hardware processors, a time-series data synthetically and a plurality of labels associated with time-series data by using least a portion of the representative time-series data in each iteration of a plurality of iterations, wherein the plurality of iterations comprises:
iteratively generating at least a portion of the time-series data synthetically in each iteration of the plurality of iterations by applying a variational auto-encoder (VAE) to a predefined amount of representative time-series data;
appending one or more labels associated with the time-series data synthetically generated in a current iteration with a set of labels associated with a previous set of iterations from amongst the plurality of iterations along with at least a portion of the representative data to obtain an updated set of labels, the set of labels comprising one or more noisy labels;
determining, by a label quality checker model, a label quality measure indicative of quality of the updated set of labels, the label quality measure determined by computing a differences in a number of identical labels from amongst the set of labels generated in a current iteration and a previous iteration; and
triggering self-correction of the updated set of labels to obtain a set of corrected labels on determination of the label quality measure below a predefined-threshold measure and satisfaction of a self-iteration count criteria associated with number of plurality of iterations within a predefined threshold value of iterations,
wherein appending the one or more labels to the set of labels which leads to reduction in percentage of the one or more noisy labels in the updated set of labels successively in each iteration,
wherein the plurality of labels are generated by applying Hierarchical clustering on learned Auto-encoded compact sequence (HC-AECS) on the representative time-series data, wherein to apply the HC-AECS, the one or more hardware processors are configured by the instructions to determine an optimal distance measure indicative of class-cluster association in the time-series data by using at least a set of labelled samples representative time-series data.

14. The one or more non-transitory machine readable information storage mediums of claim 13, wherein at least the portion of the representative time-series data comprises around five percent of the portion of the representative time-series data.

15. The one or more non-transitory machine readable information storage mediums of claim 13, wherein the VAE is capable of learning a latent representation for a current iteration from the representative time-series data and the time-series data synthetically generated in a set of previous iterations from amongst the plurality of iterations.

16. The one or more non-transitory machine readable information storage mediums of claim 13, wherein iteratively generating the time-series data synthetically comprises generating a new set of labels in each iteration, and combining the new set of labels, by using a Snorkel's model, one or more labels obtained using the predefined amount of representative time-series data and the synthetic time-series data generated in the set of previous iterations.

17. The one or more non-transitory machine readable information storage mediums of claim 13, wherein iteratively generating the time-series data synthetically comprises generating a new set of labels in each iteration, and comparing the new set of labels, by using the label quality checker model, one or more labels obtained from the predefined amount of representative time-series data and an equal amount of synthetic time-series data generated in the set of previous iterations.

18. The one or more non-transitory machine readable information storage mediums of claim 13, wherein iteratively generating the time-series data synthetically comprises generating identical amount of data using the VAE, the amount being same with an initial amount of representative data.

* * * * *